US010487877B2

(12) United States Patent
Volcansek et al.

(10) Patent No.: US 10,487,877 B2
(45) Date of Patent: Nov. 26, 2019

(54) BEARING CAGE INCLUDING HYDRODYNAMIC FEATURE

(71) Applicant: Schaeffler Technologies AG & Co. KG, Herzogenaurach (DE)

(72) Inventors: John Volcansek, Medina, OH (US); Pankaj Madhukar Patil, Wooster, OH (US); Joseph Bonvissuto, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/909,114

(22) Filed: Mar. 1, 2018

(65) Prior Publication Data

US 2019/0271358 A1    Sep. 5, 2019

(51) Int. Cl.
| | |
|---|---|
| *F16C 19/30* | (2006.01) |
| *F16C 33/66* | (2006.01) |
| *F16C 33/46* | (2006.01) |
| *F16C 19/22* | (2006.01) |

(52) U.S. Cl.
CPC ........ *F16C 33/6614* (2013.01); *F16C 19/225* (2013.01); *F16C 19/305* (2013.01); *F16C 33/4676* (2013.01); *F16C 33/4682* (2013.01); *F16C 2240/30* (2013.01)

(58) Field of Classification Search
CPC ...... F16C 19/225; F16C 19/305; F16C 19/32; F16C 33/546; F16C 33/4605; F16C 33/4682; F16C 33/4676; F16C 33/6614; F16C 33/6681; F16C 2240/30

USPC ........ 384/121, 127, 572, 575, 580, 618, 623
See application file for complete search history.

(56) References Cited

U.S. PATENT DOCUMENTS

| | | | |
|---|---|---|---|
| 3,482,891 A * | 12/1969 | Hewko | ............... F16C 33/4605 384/575 |
| 4,192,560 A | 3/1980 | Hartnett | |
| 6,206,576 B1 * | 3/2001 | Wiehl | .................... F16C 33/546 384/572 |
| 7,963,703 B2 * | 6/2011 | Takamizawa | ........... F16C 19/32 384/455 |

(Continued)

FOREIGN PATENT DOCUMENTS

| | | | | |
|---|---|---|---|---|
| JP | 3069713 B2 * | 7/2000 | ............ | F16C 33/541 |
| JP | 2009156392 A * | 7/2009 | ............ | B21D 53/12 |

(Continued)

*Primary Examiner* — Marcus Charles
(74) *Attorney, Agent, or Firm* — Volpe and Koenig, P.C.

(57) ABSTRACT

A thrust bearing cage including an improved lubrication feature is disclosed. The thrust bearing cage includes a first rim and a second rim with a plurality of crossbars extending therebetween to define rolling element pockets. Each crossbar of the plurality of crossbars includes: a first radial flange extending from the first rim; a second radial flange extending from the second rim; and a medial radial flange connecting the first radial flange and the second radial flange. The medial radial flange is axially offset from the first radial flange and the second radial flange. At least one of the first radial flange, the medial radial flange, or the second radial flange includes a protrusion defining at least one ramped surface. The ramped surface creates a hydrodynamic effect, which guides the thrust bearing cage away from an adjacent surface, and ensures that a lubricated state is maintained.

15 Claims, 11 Drawing Sheets

(56) References Cited

U.S. PATENT DOCUMENTS

| | | | |
|---|---|---|---|
| 8,926,191 B2 * | 1/2015 | Fugel | F16C 19/30 |
| | | | 384/623 |
| 9,404,537 B2 * | 8/2016 | Fugel | F16C 33/541 |
| 2007/0280575 A1 * | 12/2007 | Obayashi | F16C 33/546 |
| | | | 384/623 |

FOREIGN PATENT DOCUMENTS

| WO | WO 2012023437 A1 * | 2/2012 | F16C 33/4605 |
|---|---|---|---|
| WO | WO 2013191238 A1 * | 12/2013 | F16C 33/6614 |

* cited by examiner

BEARING CAGE INCLUDING HYDRODYNAMIC FEATURE

FIELD OF INVENTION

This invention is generally related to a thrust bearing cage.

BACKGROUND

Thrust bearings can be used in a variety of applications. One known type of application is a torque converter assembly, wherein the thrust bearing is arranged between a stator and an impeller. Thrust bearings typically include a cage for guiding and supporting rolling elements. Known types of cages in thrust bearing arrangements typically contact an adjacent support washer or bearing ring. The interface between these cages and the adjacent support surface can cause a variety of issues that affect performance of the thrust bearing arrangement. Although thrust bearings in torque converters are submerged in lubricant, failure in these applications is typically attributed to a lack of lubrication.

One type of known cage includes rolling element pockets formed as cutouts, which include sharp, non-rounded edges. These cutouts scrape lubricant off of the raceway, which increases friction, produces a relatively higher temperature, and can ultimately fracture the cage. Another type of failure occurs when the rolling elements dig or drill into the cage. As the rolling elements come into contact with the cage, a burr is pushed against the raceway, which also removes lubrication. One type of known bearing cage is disclosed in U.S. Pat. No. 4,192,560. The cage disclosed in U.S. Pat. No. 4,192,560 is directed to a radial bearing and does not sufficiently address the issues associated with cages in thrust bearings.

It would be desirable to provide a thrust bearing cage that is durable, and does not remove lubricant from an adjacent raceway surface.

SUMMARY

A thrust bearing cage including an improved lubrication feature is disclosed. The thrust bearing cage includes a first rim and a second rim with a plurality of crossbars extending therebetween to define rolling element pockets. Each crossbar of the plurality of crossbars includes: a first radial flange extending from the first rim; a second radial flange extending from the second rim; and a medial radial flange connecting the first radial flange and the second radial flange. The medial radial flange is axially offset from the first radial flange and the second radial flange. At least one of the first radial flange or the second radial flange includes a protrusion defining at least one ramped surface. The ramped surface creates a hydrodynamic effect, which effectively guides the thrust bearing cage away from an adjacent raceway surface. The ramped surface also ensures that a film of lubricant is maintained, which reduces the coefficient of friction and maintains a relatively lower operating temperature.

Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 1A:
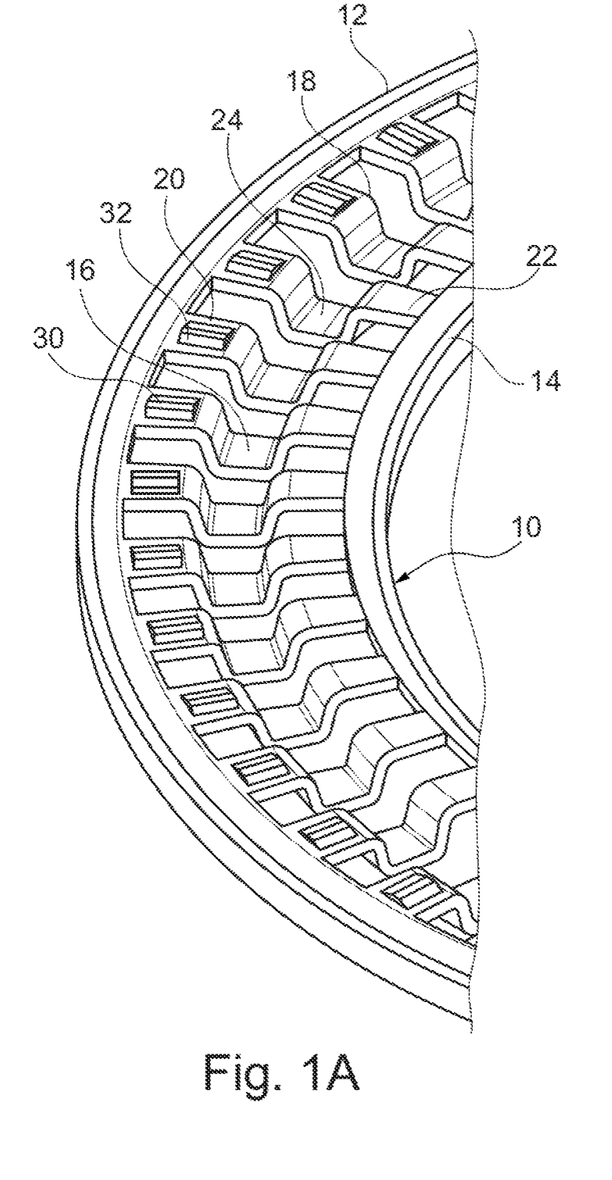
FIG. 1A is a partial perspective view of a thrust bearing cage according to a first embodiment.
Figure 1B:
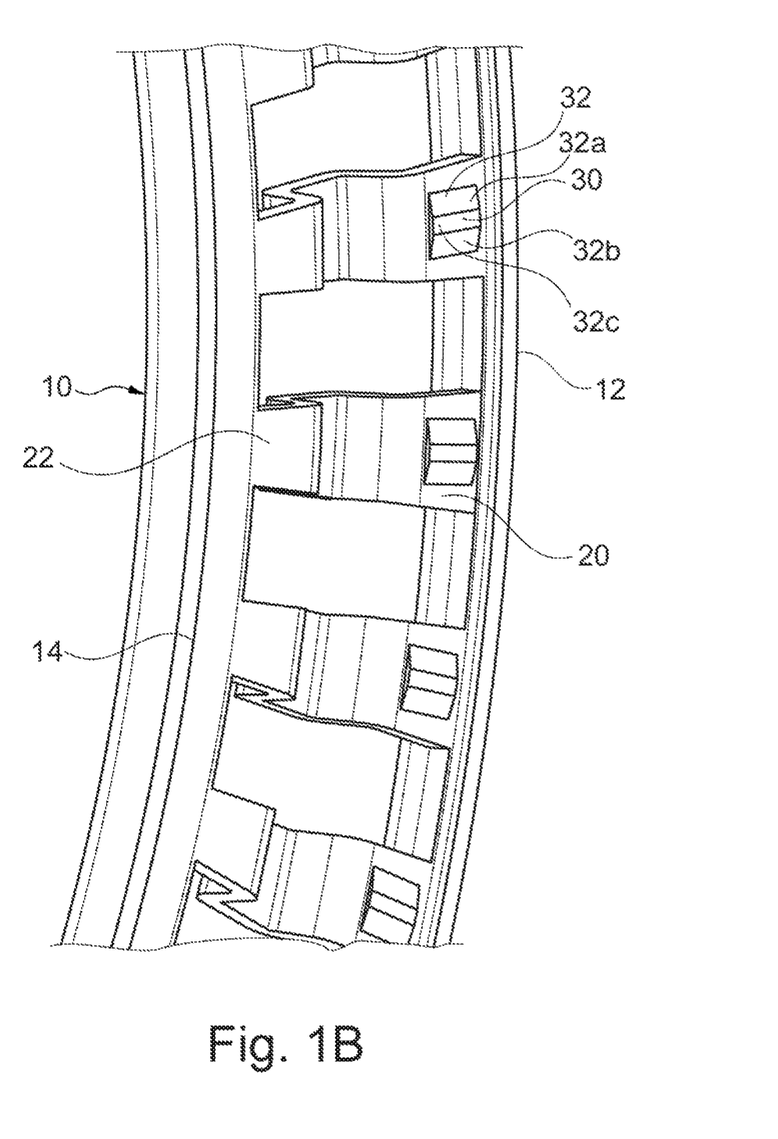
FIG. 1B is a magnified partial perspective view of the thrust bearing cage according to the first embodiment.
Figure 1C:
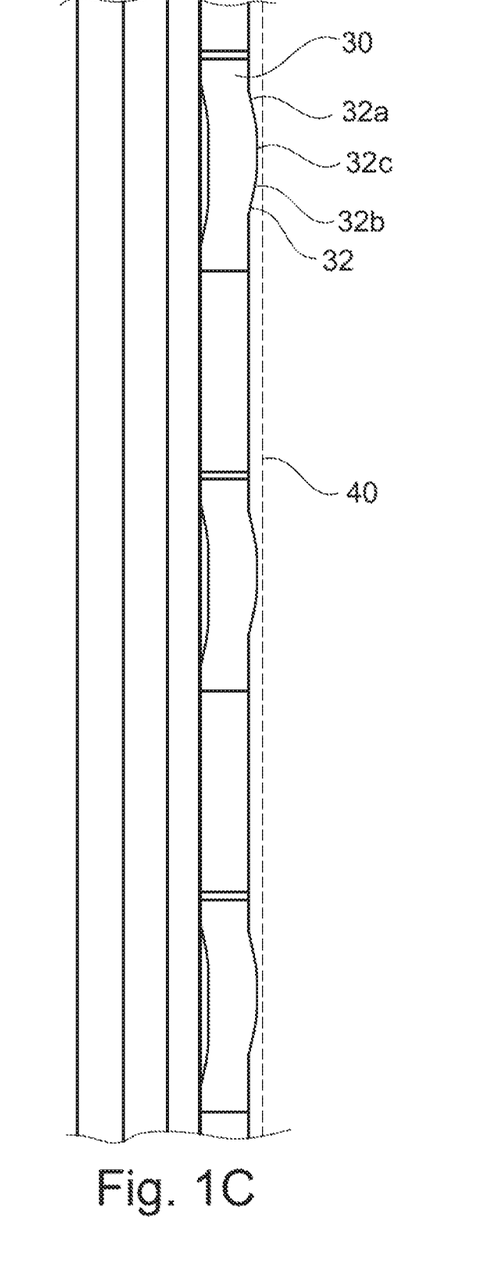
FIG. 1C is a top view of the thrust bearing cage according to the first embodiment.

As shown in FIGS. 1A-1C, a thrust bearing cage 10 is illustrated. The thrust bearing cage 10 includes a first rim 12 and a second rim 14 with a plurality of crossbars 16 extending therebetween to define rolling element pockets 18. Each crossbar 16 includes a first radial flange 20 extending from the first rim 12, a second radial flange 22 extending from the second rim 14, and a medial radial flange 24 connecting the first radial flange 20 and the second radial flange 22. The medial radial flange 24 is axially offset from the first radial flange 20 and the second radial flange 22. At least one of the first radial flange 20 or the second radial flange 22 includes a protrusion 30 defining at least one ramped surface 32. As shown in FIGS. 1A and 1B, the first radial flange 20 includes the protrusion 30 and the ramped surface 32. The protrusion 30 and the ramped surface 32 are located on the cage 10 on the crossbar 16 and in a region located away from the first rim 12 and the second rim 14.

One of ordinary skill in the art would recognize from the present disclosure that the protrusion 30 and the ramped surface 32 can be provided on just one of the radial flanges 20, 22 or both of the radial flanges 20, 22. In another embodiment, any one or more of the radial flanges 20, 22 and the medial radial flange 24 can include protrusions 30 and ramped surfaces 32.

Figure 4:
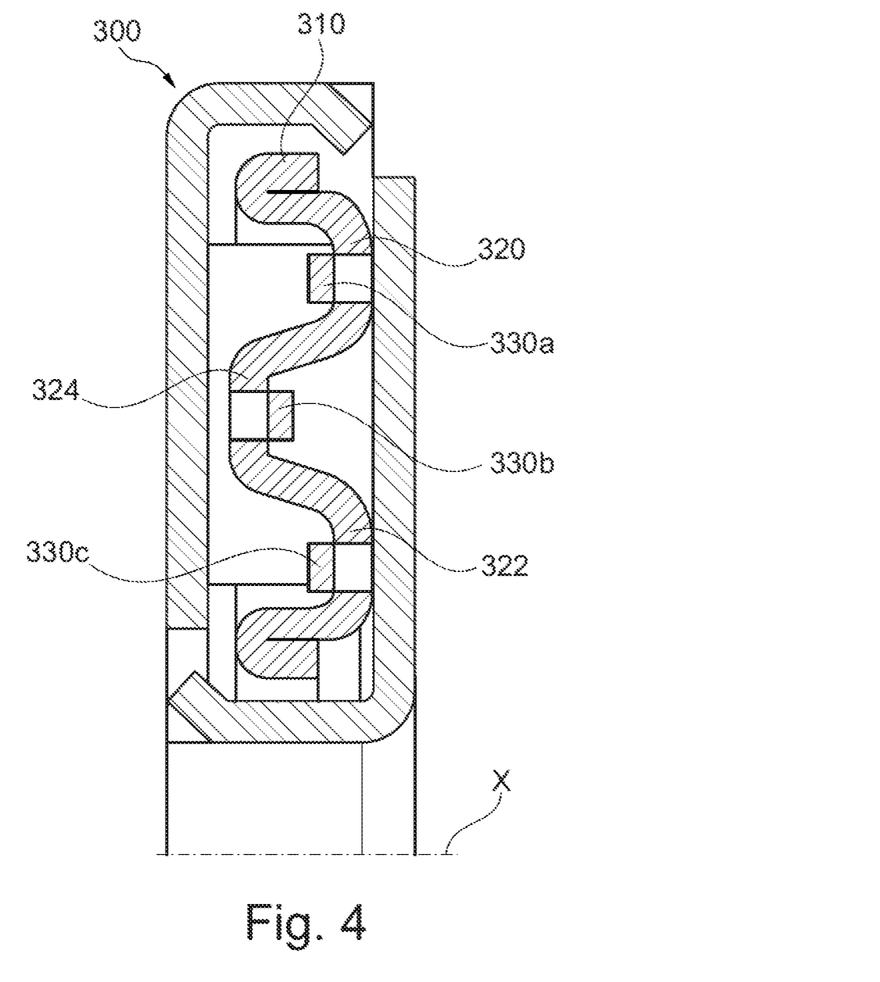
FIG. 4 is a cross section view of a thrust bearing arrangement and thrust bearing cage according to the fourth embodiment.

FIG. 4 illustrates an embodiment in which a thrust bearing cage arrangement 300 includes a cage 310 with three protrusions 330a, 330b, 330c. As shown in FIG. 4 there is a protrusion 330a on the first radial flange 320, a protrusion 330b on the medial radial flange 324, and a protrusion 330c on the second radial flange 322.

As shown in FIGS. 1A-1C, the ramped surface 32 of the protrusion 30 includes two ramped surfaces 32a, 32b angled in opposite directions from each other and connected by a flat surface 32c. This configuration, including ramped surfaces 32a, 32b in opposite directions, can be used in applications in which rotation of the thrust bearing cage 10 in both directions is required. As shown in the drawings, both ramped surfaces 32a, 32b have an identical incline. One of ordinary skill in the art would understand from the present application that the characteristics of the ramped surfaces 32a, 32b can be varied. Additionally, the flat surface 32c between the two ramped surfaces 32a, 32b can be omitted, and the two ramped surfaces 32a, 32b could meet at a point.

The ramped surface 32 creates a hydrodynamic effect, which guides the thrust bearing cage 10 away from an adjacent raceway surface. The adjacent raceway surface can be formed on a thrust support washer or other type of support element. As shown in FIG. 1C, the adjacent raceway 40 is illustrated with dashed lines. During operation, the ramped surface 32 builds up fluid pressure between the cage 10 and the adjacent raceway 40, and creates a force on the adjacent facing surfaces of the ramped surface 32 and the adjacent raceway surface 40. The ramped surface 32 ensures that a film of lubricant is maintained, which reduces the coefficient of friction and maintains a relatively lower operating temperature.

In one embodiment, the cage 10 is formed from stamped sheet metal. In one embodiment, the protrusion 30 is formed by punching. This configuration provides a simplified formation process for the cage 10. The cage 10 has a uniform thickness, and a thickness of the ramped surface 32 is identical to a remainder of the cage 10.

In one embodiment, the thrust bearing cage 10 is used in a torque converter. One of ordinary skill in the art would understand from the present disclosure that the thrust bearing cage 10 can be used in a variety of applications, such as transmissions, power drives, turbo chargers, super chargers, or other engine components.

Figure 2A:
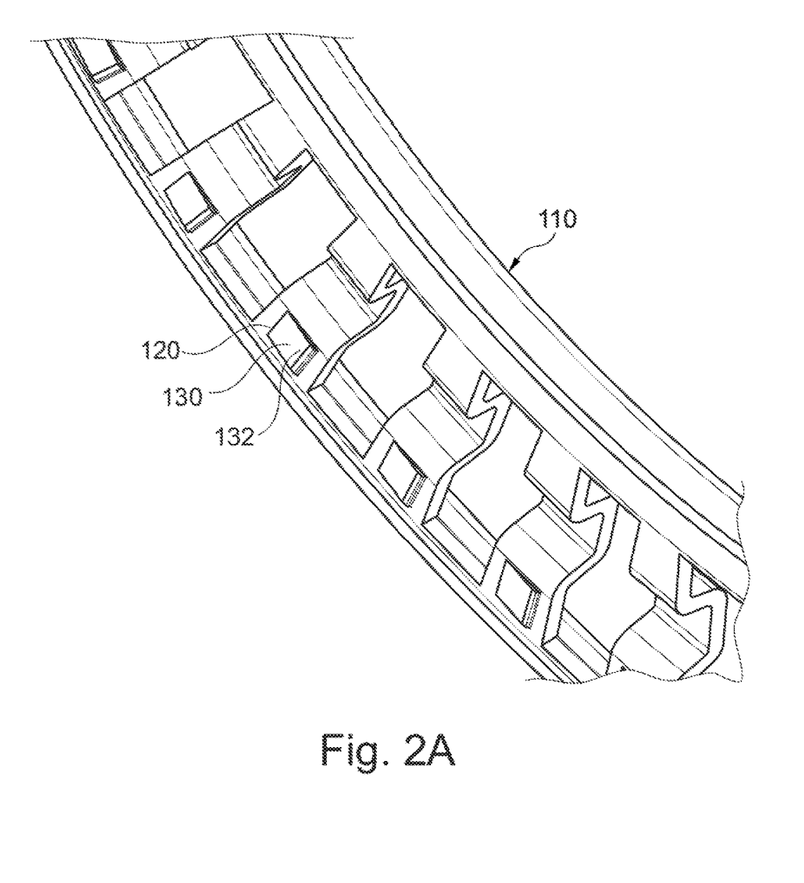
FIG. 2A is a partial perspective view of a thrust bearing cage according to a second embodiment.
Figure 2B:
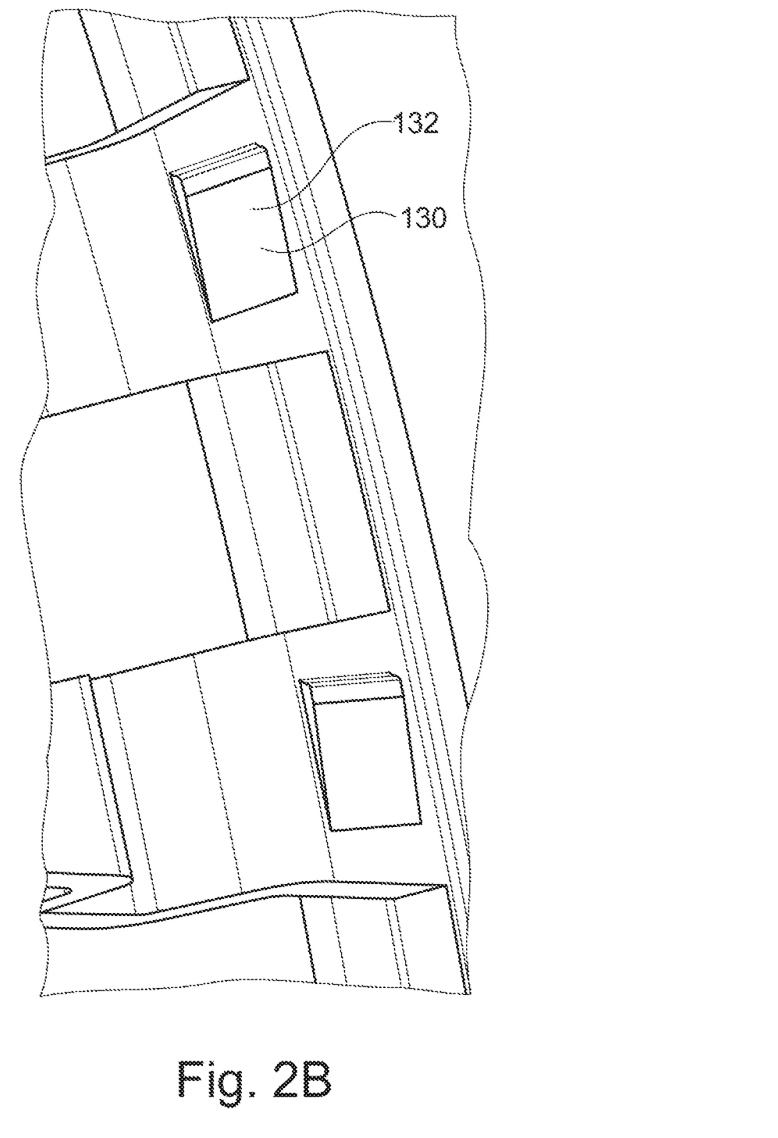
FIG. 2B is a magnified partial perspective view of the thrust bearing cage according to the second embodiment.
Figure 2C:
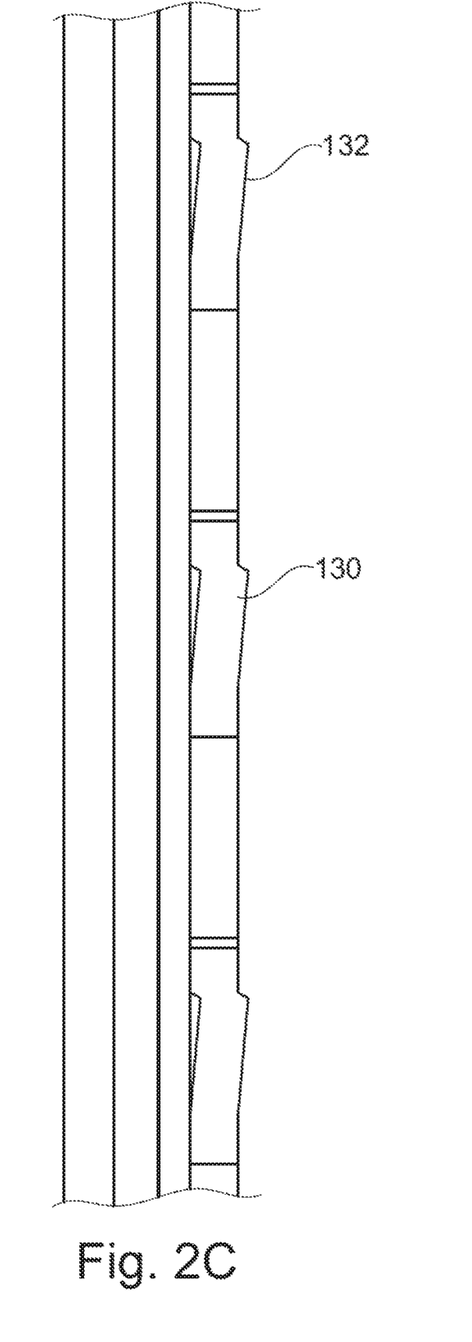
FIG. 2C is a top view of the thrust bearing cage according to the second embodiment.

In another embodiment of the thrust bearing cage 110 shown in FIGS. 2A-2C, the first radial flange 120 includes the ramped surface 132 of the protrusion 130. In this embodiment, the ramped surface 132 includes a single ramped surface 132. The single ramped surface 132 can be used in applications in which the thrust bearing cage 110 experiences relative rotation in only one direction. The single ramped surface 132 provides the same hydrodynamic effect described above with respect to the ramped surface 32 of the first embodiment.

Figure 3A:
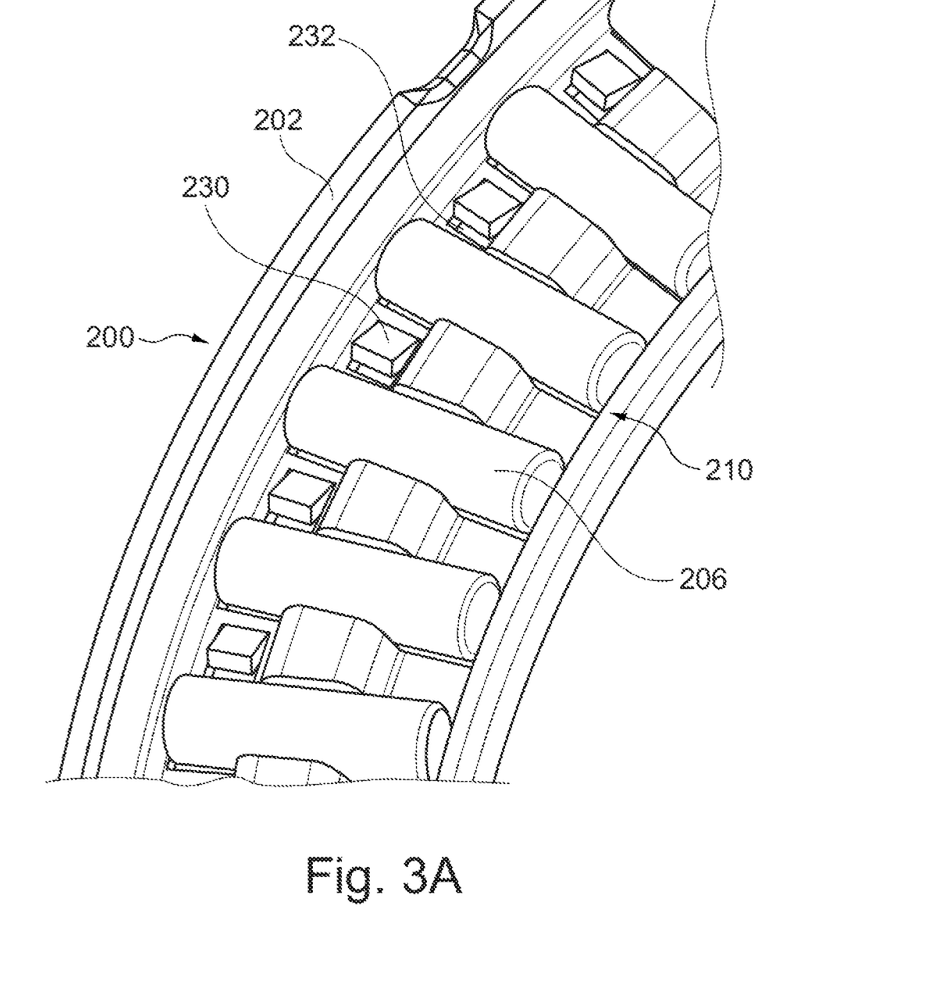
FIG. 3A is a perspective view of a thrust bearing arrangement including a thrust bearing cage according to a third embodiment.
Figure 3B:
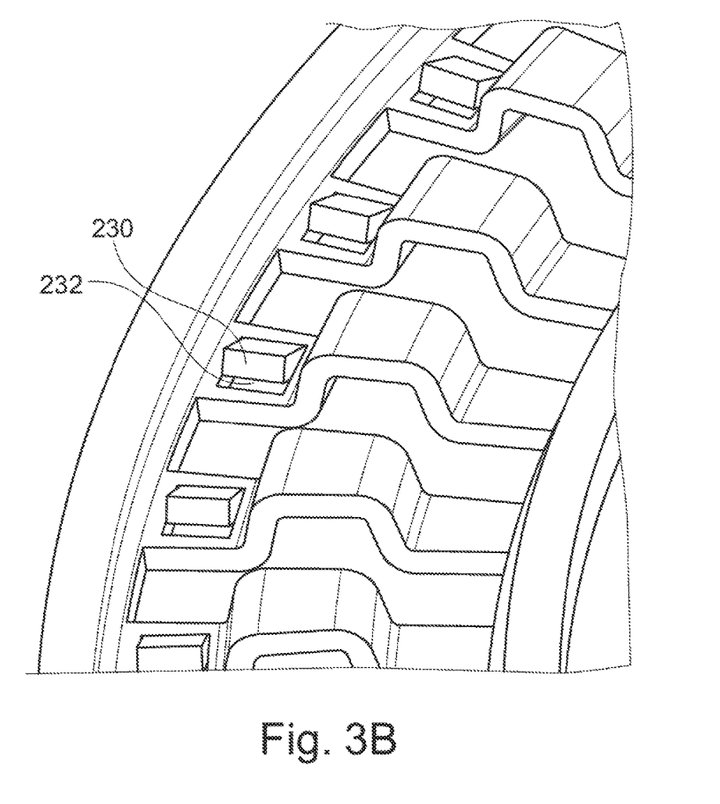
FIG. 3B is a partial perspective view of the thrust bearing cage according to the third embodiment.
Figure 3C:
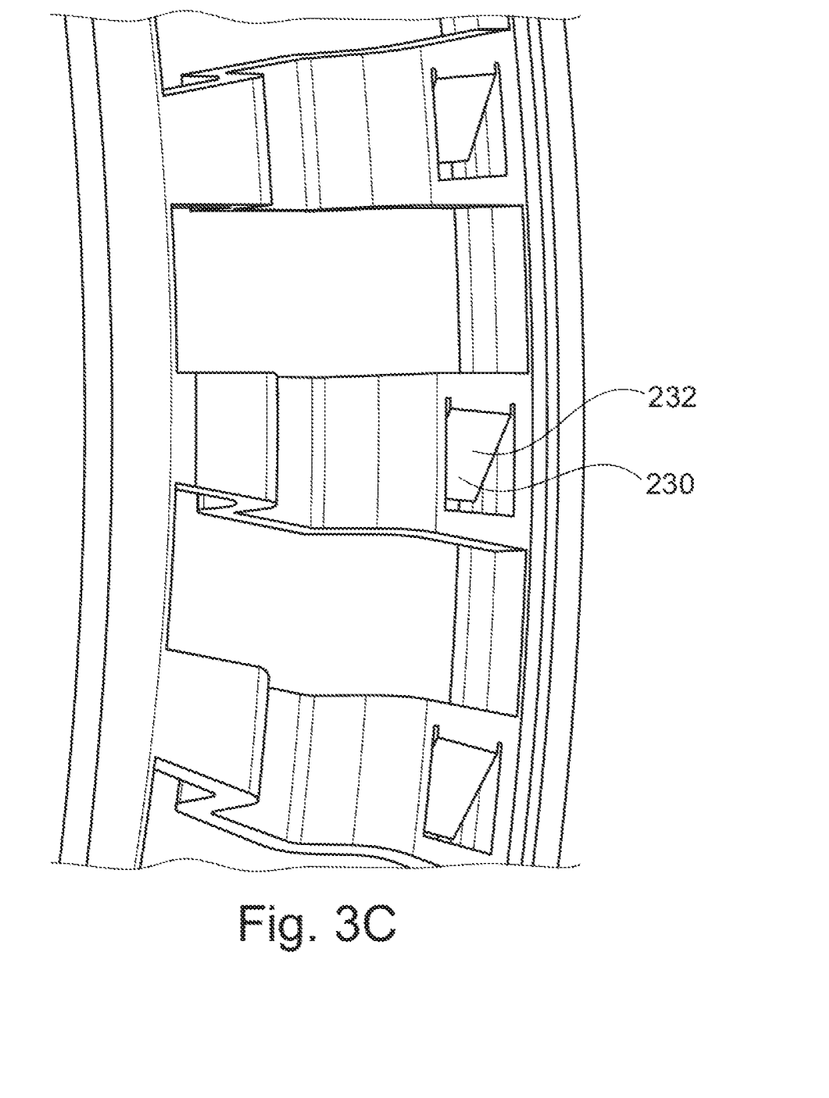
FIG. 3C is a magnified partial perspective view of the thrust bearing cage according to the third embodiment.
Figure 3D:
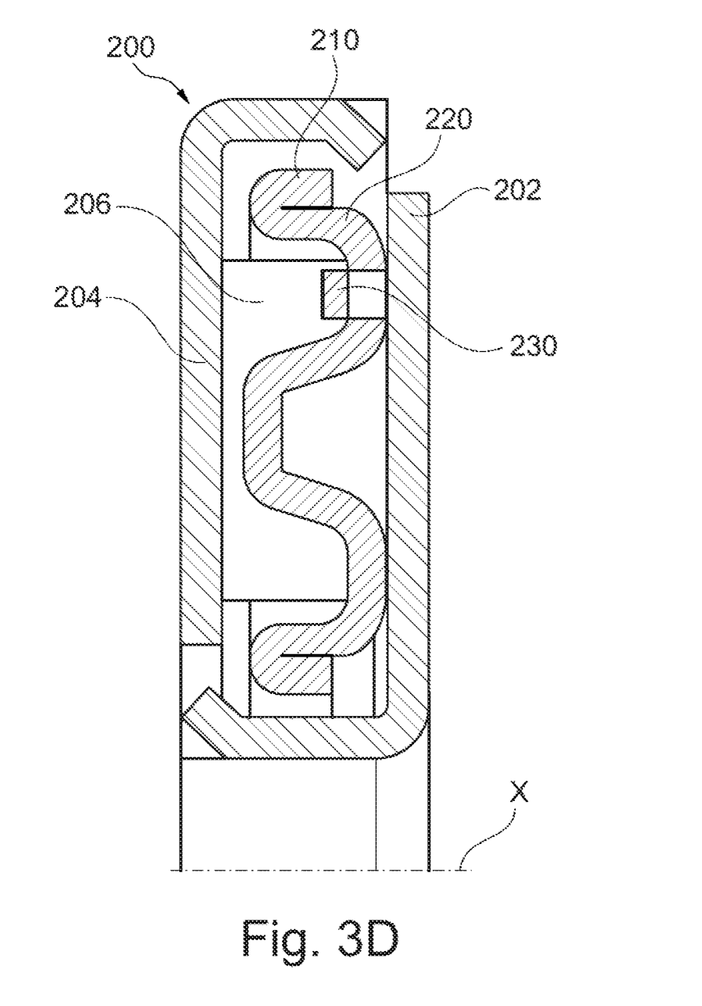
FIG. 3D is a cross section view of the thrust bearing arrangement and thrust bearing cage according to the third embodiment.

In one embodiment of the thrust bearing cage 210 shown in FIGS. 3A-3D, the protrusion 230 defines an opening 232. As shown in FIG. 3D, the thrust bearing cage 210 is installed between a first bearing ring 202 and a second bearing ring 204 to form a thrust bearing arrangement 200. Rolling elements 206 held in the cage 210 are supported directly against the bearing rings 202, 204. One of ordinary skill in the art would understand from the present disclosure that the profile of the rings 202, 204 can be varied. As shown in FIGS. 3A-3D, the first radial flange 220 includes the protrusion 230 and the opening 232. In the embodiment illustrated in FIGS. 3A and 3D, the rolling elements 206 are needle rollers. One of ordinary skill in the art would understand from the present disclosure that alternative types of rolling elements can be used.

Having thus described various embodiments of the present thrust bearing cage in detail, it is to be appreciated and will be apparent to those skilled in the art that many changes, only a few of which are exemplified in the detailed description above, could be made in the thrust bearing cage without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS thrust bearing cage 10
first rim 12
second rim 14
crossbars 16
rolling element pockets 18
first radial flange 20
second radial flange 22
medial radial flange 24
protrusion 30
ramped surface 32
thrust bearing arrangement 200
bearing rings 202, 204
rolling elements 206
opening 232

What is claimed is:

1. A thrust bearing cage comprising:
    a first rim and a second rim with a plurality of crossbars extending therebetween to define rolling element pockets;
    each crossbar of the plurality of crossbars including:
        a first radial flange extending from the first rim;
        a second radial flange extending from the second rim;
        a medial radial flange connecting the first radial flange and the second radial flange, the medial radial flange being axially offset from the first radial flange and the second radial flange; and
    at least one of the first radial flange, the medial radial flange, or the second radial flange includes a protrusion defining at least one ramped surface spaced apart from the first rim and the second rim.

2. The thrust bearing cage of claim 1, wherein the at least one ramped surface of the protrusion includes two ramped surfaces.

3. The thrust bearing cage of claim 2, wherein the two ramped surfaces are angled in opposite directions from each other and are connected by a flat surface.

4. The thrust bearing cage of claim 1, wherein the at least one ramped surface includes a single ramped surface.

5. The thrust bearing cage of claim 1, wherein the protrusion defines an opening.

6. The thrust bearing cage of claim 1, wherein the protrusion projects in an axial outward direction from the at least one of the first radial flange or the second radial flange.

7. The thrust bearing cage of claim 1, wherein the protrusion projects in an axial inward direction from the at least one of the first radial flange or the second radial flange.

8. The thrust bearing cage of claim 1, wherein the cage is formed from stamped sheet metal and the protrusion is formed by punching.

9. The thrust bearing cage of claim 1, wherein the first radial flange is radially outward from the medial radial flange and the second radial flange, and the first radial flange includes the protrusion.

10. A thrust bearing arrangement comprising:
a bearing cage including:
   a first rim and a second rim with a plurality of crossbars extending therebetween to define rolling element pockets,
   each crossbar of the plurality of crossbars including:
   a first radial flange extending from the first rim;
   a second radial flange extending from the second rim;
   a medial radial flange connecting the first radial flange and the second radial flange, the medial radial flange being axially offset from the first radial flange and the second radial flange; and
   at least one of the first radial flange, the medial radial flange, or the second radial flange includes a protrusion defining at least one ramped surface spaced apart from the first rim and the second rim;
a plurality of rolling elements arranged in the rolling element pockets;
a first bearing ring arranged on a first axial side of the bearing cage and a second bearing ring arranged on a second axial side of the bearing cage.

11. The thrust bearing arrangement of claim 10, wherein the at least one ramped surface of the protrusion includes two ramped surfaces.

12. The thrust bearing arrangement of claim 11, wherein the two ramped surfaces are angled in opposite directions from each other and are connected by a flat surface.

13. The thrust bearing arrangement of claim 10, wherein the protrusion defines an opening.

14. The thrust bearing arrangement of claim 10, wherein the cage is formed from stamped sheet metal and the protrusion is formed by punching.

15. The thrust bearing arrangement of claim 10, wherein the plurality of rolling elements are needle rollers.

* * * * *